US008493754B1

(12) United States Patent
Wambsganss et al.

(10) Patent No.: US 8,493,754 B1
(45) Date of Patent: Jul. 23, 2013

(54) METHOD OF AND APPARATUS FOR POWER FACTOR CORRECTION IN A POWER SUPPLY

(75) Inventors: Warren J. Wambsganss, Van Horne, IA (US); Brent C. Peterson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 375 days.

(21) Appl. No.: 12/895,581

(22) Filed: Sep. 30, 2010

(51) Int. Cl.
*H02J 1/10* (2006.01)
(52) U.S. Cl.
USPC ............... 363/65; 363/89; 363/90; 363/97; 323/284; 323/285
(58) Field of Classification Search
USPC ........ 363/65, 72, 88, 89, 90, 97, 98; 323/284, 323/285
See application file for complete search history.

(56) References Cited

U.S. PATENT DOCUMENTS

| | | | | |
|---|---|---|---|---|
| 6,144,194 | A * | 11/2000 | Varga | 323/285 |
| 6,344,986 | B1 * | 2/2002 | Jain et al. | 363/89 |
| 2003/0161167 | A1 * | 8/2003 | Barnett et al. | 363/72 |
| 2010/0080029 | A1 * | 4/2010 | Luu | 363/127 |
| 2011/0096573 | A1 * | 4/2011 | Zhu et al. | 363/21.17 |
| 2011/0110134 | A1 * | 5/2011 | Gaboury et al. | 363/126 |

\* cited by examiner

*Primary Examiner* — Nguyen Tran
(74) *Attorney, Agent, or Firm* — Donna P. Suchy; Daniel M. Babieri (57) ABSTRACT

A converter can include at least two power stages. Each power stage can include a power factor control circuit. An active shared control circuit for a three power stage system receives at least three sense signals. Each of the sense signals is associated with a parameter of the respective one of the power stages. The control circuit provides at least three control signals. Each of the control signals being associated with the respective power factor control circuit of the power stages. The active share control circuit balances the current supplied by the power stages via the control signals.

20 Claims, 12 Drawing Sheets

METHOD OF AND APPARATUS FOR POWER FACTOR CORRECTION IN A POWER SUPPLY

BACKGROUND OF THE INVENTION

The present application generally relates to power circuits. More particularly, the present application relates to a power converter.

Power converters are utilized on a multitude of applications where power conversion is required, such as, in power supply applications. One such application includes supplying power to electronic equipment on-board an aircraft. Aircraft power supplies can be used to supply power to a variety of equipment, including but not limited to radios, computers, navigation equipment, flight controls, radar, sensors, etc.

Conventional aircraft power supplies operating at high power levels generally receive three phase alternating current (AC) input power and use line frequency transformers. This approach is a heavy and bulky generally not desirable for aircraft applications.

Generally, conventional aircraft three phase power supplies have relied on passive techniques to meet power factor and harmonic current requirements. One such passive technique often uses a polyphase transformer coupled to a rectifier array. In addition, components associated with such a design can be expensive.

Another conventional power supply approach has utilized a power factor correction circuit to meet stringent power factor and harmonic current requirements for alternating current (AC) loads. This conventional approach uses a boost power factor control circuit followed by a second converter to provide an isolated output. The topology for this circuit has several drawbacks including reduced efficiency, reliability, high in-rush current, and high parts count.

Usage of the Single-Ended Primary Inductance Converters (SEPIC) operating in continuous conduction mode have not been widely utilized in power factor correction applications due to poor performance caused by power stage circuit resonance. The degraded performance is due to the need to limit bandwidth to avoid control loop instability caused by resonance between the coupling capacitor and circuit inductance. Avionics power systems use higher line frequencies (360-800 Hz) and require high bandwidth in power factor corrected converters. The performance degradation caused by the circuit resonance can be improved with an active clamp. Active clamps can also increase efficiency using a soft switching technique, however the active clamp can add significant complexity and can be difficult to implement reliably due to high voltages in the primary circuit.

The SEPIC topology does offer the attractive potential to achieve isolation in one converter stage. This isolation allows three converters to combine output power in a three phase configuration. Previous attempts to implement individual converters operating from each phase combined into one single output often interact in an undesirable manner. This interaction is caused by the need for one common error amplifier to regulate the output voltage and also provides precise control of power sharing between the individual converters.

Therefore, there is a need for a power converter which closely shares individual phase line circuits to reduce power systems phase load imbalance. Further, there is a need for an aircraft three phase input power supply that utilizes active power factor correction. Further still, there is a need for an aircraft power supply that is lighter and less expensive and meets stringent aircraft harmonic performance and power factor performance requirements. Yet further still, there is a need for a power supply that actively cancels sources of imbalance and prevents feedback loop interaction between converters.

SUMMARY OF THE INVENTION

An exemplary embodiment relates to a converter. The converter includes at least three power stages including a power factor control circuit. The converter also includes an active shared control circuit receiving at least three sense signals. Each of the sense signals being associated with a parameter of a respective one of the power stages. The control circuit provides at least three control signals. Each of the control signals is associated with a respective power factor control circuit of the power stages. The active share control circuit balances the current supplied by the power stages via the control signals.

Another exemplary embodiment relates to an aircraft three phase power converter. The three phase power converter includes a first power stage, a second power stage, and a third power stage. The first, second and third power stages receive first, second and third phase rectified power, respectively. The power converter also includes an active control circuit. The active control circuit has a first control output coupled to the first power stage, a second control output coupled to the second power stage and a third control output coupled to the third power stage. The active control circuit also has a first input coupled to receive a first sense signal from a first output of the first power stage, a second input coupled to receive a second sense signal from a second output of the second power stage, and a third input coupled to receive a third sense signal from a third output of the third power stage. Each of the first, second and third sense signals being associated with a parameter of a respective one of the first, second and third power stages. The active control circuit balances the current supplied by the first, second and third power stages.

Yet another exemplary embodiment relates to a method of providing power. The method includes providing a first power signal from a first phase power stage, providing a second power signal from a second phase power stage, and providing a third power signal from a third phase power stage. The method also includes receiving a first sense signal related to the first power signal, receiving a second sense signal related to the second power signal, and receiving a third sense signal related to the third power signal. The method further comprises providing a first control signal to the first power phase stage, providing a second control signal to the second power phase stage, and providing a third control signal to a third power phase stage. The first control signal, the second control signal and the third control signal are provided to balance the first power signal, the second power signal and the third power signal.

DETAILED DESCRIPTION OF THE PREFERRED EMBODIMENTS

Before describing in detail the particular improved system and method, it should be observed that the invention includes, but is not limited to, a novel structural combination of conventional components and not to the particular detailed configurations thereof. Accordingly, the structure, methods, functions, control, and arrangement of conventional components, circuits and signals have, for the most part, been illustrated in drawings, by readily understandable block representations and schematic guidelines, in order not to obscure the disclosure with structural details which will be readily apparent to those skilled in the art having the benefit of the description herein. Further, the invention is not limited to the particular embodiments detected in the exemplary diagrams or described herein, but should be construed in accordance with the language in the claims.

According to one preferred embodiment, a power supply can be a three phase input high power factor Single Ended Primary Inductance Converter (SEPIC) operating at high frequency that offers reduced weight and volume for avionics applications. In this preferred embodiment, the active converter utilizes options for multilevel interleaving of power conversion stages to permit very high density packaging. Additionally, the interleaving can result in ripple current cancellation on both the input and output further reducing the filtering requirements. The selected topology can further allow galvanic isolation to the load interface and offers a highly regulated output voltage. An advantageous active current sharing approach preferably allows effective phase to phase power sharing while eliminating control instabilities with the voltage regulation control loop, and nearly eliminating line frequency related voltage ripple allowing high voltage loop bandwidth. An efficient and time selective active damping of the power stage parasitic energy can further reduce non-linearities and harmonic current emissions.

Figure 1:
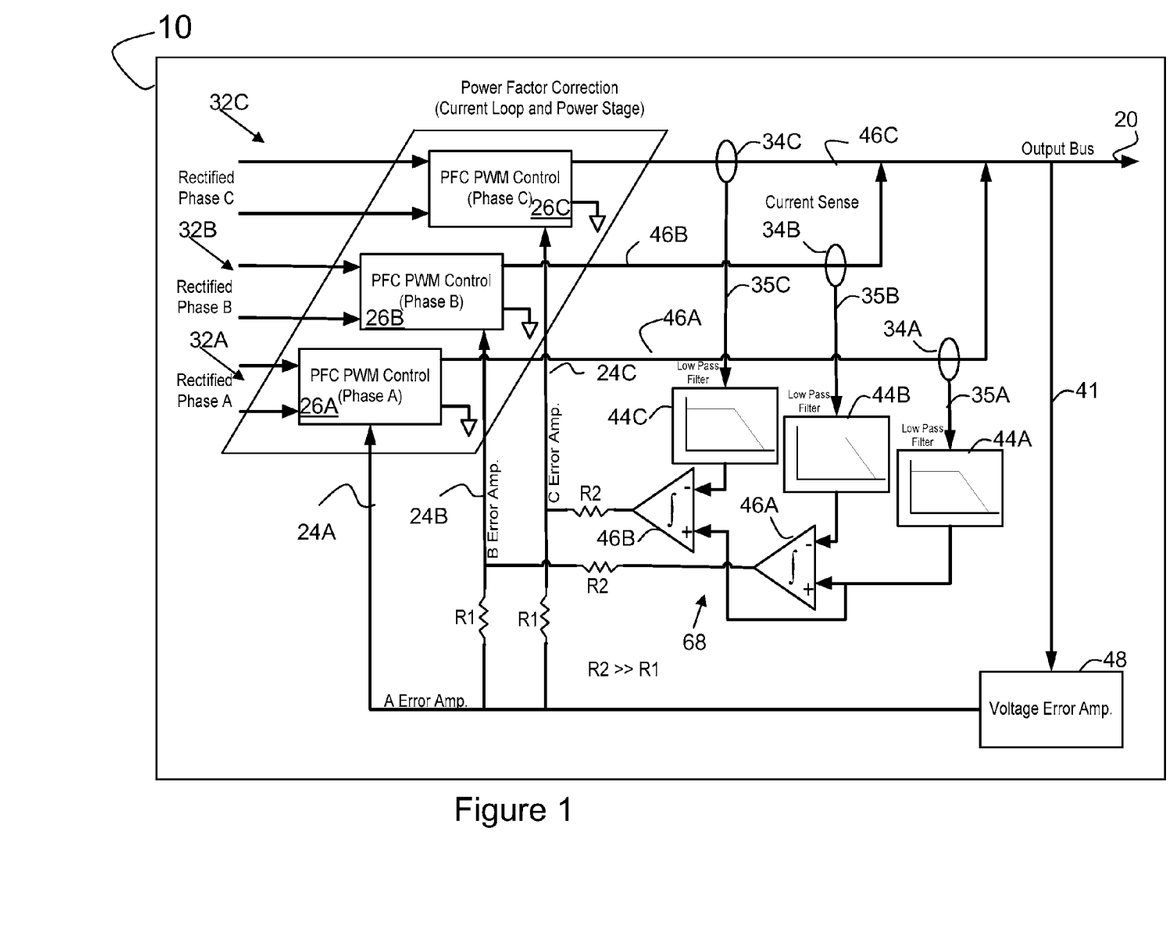
FIG. 1 is a block diagram of a power converter system with output current share control in accordance with an exemplary embodiment.

With reference to FIG. 1, a power supply system 10 can be utilized in any environment requiring three phase alternating current power conversion. In one embodiment, system 10 is an inductive-based power converter system, such as, a single ended primary inductance converter-based (SEPIC-based) system. System 10 preferably regulates power sharing between three separate power converter stages 26A-C to achieve phase power factor correction. Alternatively, system 10 and its stages 26A-C can have a buck topology, a boost topology or a transformer isolated derivation thereof.

System 10 is described below for use in an aircraft environment and can be configured as a 1 kilowatt (KW) on-board aircraft power supply. In one embodiment, system 10 is configured to meet DO-160 and ABD100 requirements. However, system 10 can be utilized in other environments in which power conversion is desired. The present invention is not limited to the specific applications, signals and components described herein unless specifically recited in the claims.

Preferably, system 10 operates according to a method for sharing output power from separate power converter stages 26A-C. In one embodiment, a significant amount of phase load imbalance is prevented from occurring. System 10 shares power to cancel the sources of imbalance and prevent feedback loop interaction between stages 26A-C.

System 10, operating as an aircraft power supply, preferably and advantageously provides regulated output voltage over a wide input frequency range and can achieve a power factor of greater than 0.98 with a total harmonic distortion of less than 3 percent. According one embodiment, system 10 utilizes power stages 26A-C as interleaved SEPIC converters to provide ripple cancellation at their inputs for reduced conducted emissions. High frequency switching can be used to provide a small lightweight solution.

Figure 2:
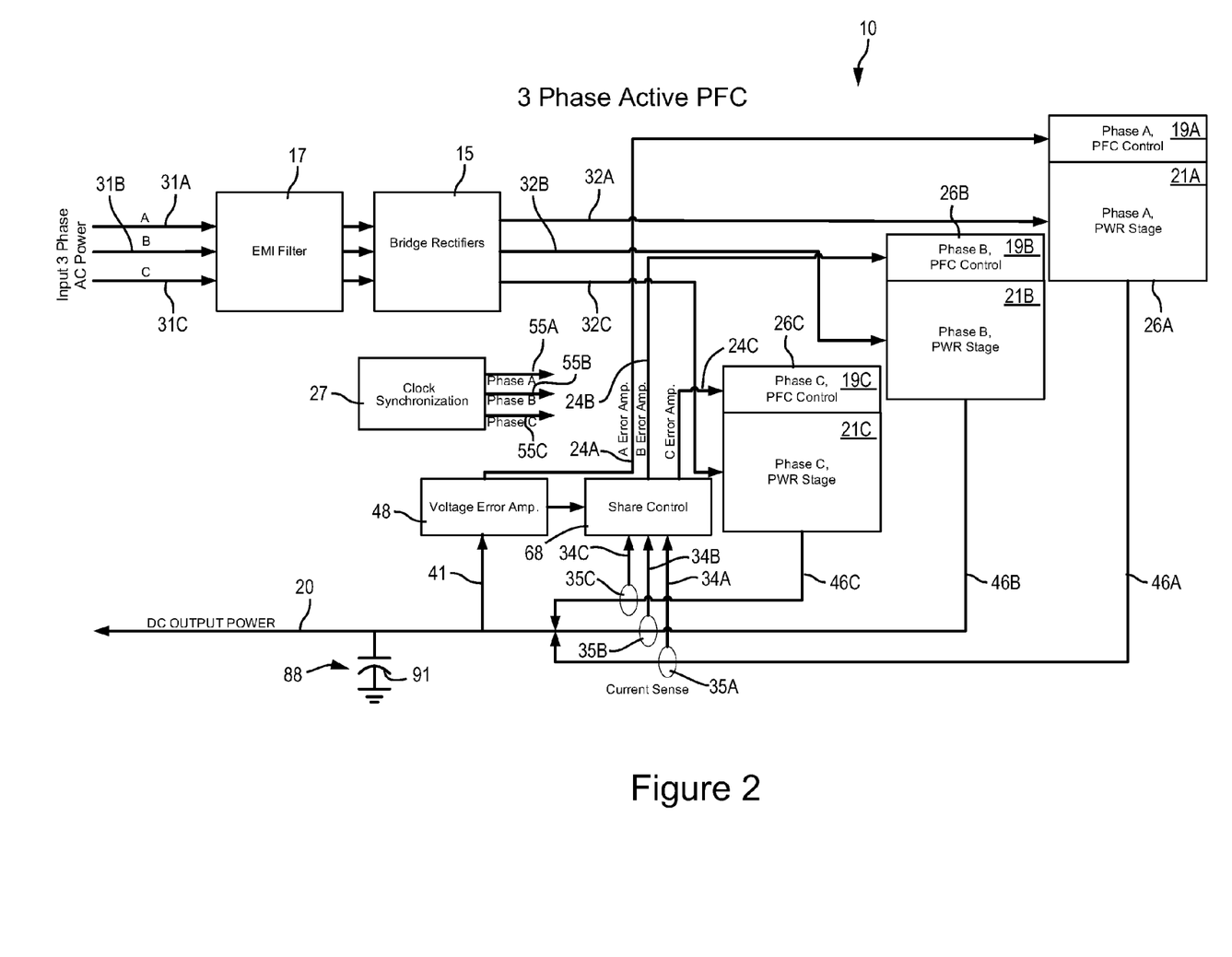
FIG. 2 is block diagram of the overall system illustrated in FIG. 1 in accordance with another exemplary embodiment.

With reference to FIGS. 1 and 2, power stages 26A-C each include a respective phase control circuit 19A-C and a respective power stage circuit 21A-C. Each power stage circuit 21A-C can be comprised of two power stages. Alternatively, a single power stage or more than two power stages can be utilized for each of stages 26A-C. Power stages 26A-C receive full wave rectified AC power from rectifier circuit 15 for each phase of power on power lines 32A-C. Preferably, each of power lines 32A-C includes a rectified AC power line and a return line. AC power is provided to rectifier circuit 15 on power lines 31A-C. Preferably, the power on lines 31A-C is provided in three phases at 115 VAC.

Phase control circuits 19A-C control power stages circuits 21A-C to provide DC power (e.g., 50 Volts (V), 20 Amp (A)) at power lines 46A-C. Filter capacitor bank 88 is coupled between output bus 20 and ground. Bank 88 includes energy storage and low frequency ripple capacitors 91 which are preferably large value aluminum electrolytic capacitors coupled to output bus 20.

Stage circuit switching for circuits 21A-C can be interleaved together to form three respective converters that provide partial cancellation of input ripple current. Stage circuits 21A-C are controlled by their respective control circuit 19A-C. Each of stage circuits 21A-C can be additionally interleaved to include a first stage that is switched 180 degrees out of phase and from its respective second stage. System 10 preferably regulates equal power sharing using three active power factor control circuits 19A-C. Power factor control circuits 19A-C can be implemented by various circuits, processors, ASICs, integrated circuits, etc.

Current sharing on the output of each converter feeding a regulated voltage yields the effect of power sharing of each converter stage 26A-C. Highly accurate power sharing dramatically reduces voltage ripple at harmonics of the line frequency across output capacitor 91. The preferred technique results in reduced output ripple voltage and also reduces the required size of output capacitor 91. Current sharing of line current generally would not yield this result if there is any amount of voltage phase imbalance. Many loads benefit from this reduced output ripple and noise, especially when there is phase imbalance in the input voltage. The low output voltage ripple allows higher voltage error amplifier bandwidth, and fast response to changes in load current.

The power at outputs 46A-C is provided through a capacitor bank 88 to power output 20. Power stages 26A-C are preferably controlled by power factor correction (PFC), pulse width modulated (PWM) control circuits, (e.g., circuits 19A-C). Stage circuits 21A-C can be operated in a fixed frequency discontinuous conduction mode having a fixed duty cycle for a given line or load condition. Preferably, discontinuous conduction mode allows current at the output of stages 26A-C to fall to zero at each switch cycle. Alternatively, stage circuits 21 A-C can be operated in a fixed frequency continuous conduction mode using a second control loop to create the basic error signal 24A incorporating an average input current control. Operating in continuous conduction mode reduces the size of an EMI filter. System 10 preferably controls stages 26A-C so that input current is proportional to the input voltage at the power line frequency.

The current at lines 46A-C (e.g., outputs) of each of conversion power stages 26A-C are sensed by current transducers 34A-C. Transducers 34A-C can include circuitry for conditioning sense signals which are provided on lines 35A-C. Alternatively, other sensory devices and circuitry can be utilized to sense parameters at lines 46A-C. The sensed current signals on lines 35A-C are passed through low-pass filters 44A-C associated with share control circuit 68 (FIG. 2) by transducers 34A-C to determine the time average output current for each of stages 26A-C. A voltage error amplifier circuit 48 senses the output voltage via a line 41 and creates an error voltage signal (phase A error signal), which is provided to control circuit 19A of stage 26A via line 24A. The error voltage signal represents the difference between a desired output voltage at output bus 20 and the actual voltage at output bus 20. The error voltage signal causes stage 26A to adjust its output so that the desired voltage is provided at output bus 20.

Two integrators 46A and 46B of share control circuit 68 receive the filtered current sense signal from low pass filter 44A as a reference input, and shift the error voltage signal slightly to create the phase B and C error voltage signals to cause current sharing between stages 26B and 26C via lines 24 B and C to circuits 19 B and C, respectively. Current sharing between stages 26 B and C is achieved by causing stages 26B and 26C to follow stage 26A. Preferably, the B and C error voltage signals from share control circuit 68 ensures that stages 26A, 26B, and 26C provide the same amount of average current at output bus 20.

The integrator bandwidth associated with amplifiers 46A-B is preferably set very low so there is very little or no oscillatory interaction with the voltage error amplifier circuit associated with circuit 48. System 10 can advantageously avoid feedback loop interaction and oscillatory behavior by limiting the bandwidth of the current balance integrator circuits (e.g., amplifiers 46A-B). Therefore, system 10 preferably enforces power sharing between separate power converter stages 26A-C by using integrator amplifiers 46A-B to shift the error voltage signal the master error amplifier voltage signal in order to produce error amplifier voltages (phase B and C error voltage signals) for the remaining phases. Current sharing may not be accurate during transient conditions such as immediately after turn-on or immediately after a phase voltage imbalance occurs, but the steady state controls accomplish very accurate power sharing between the stages 26A-C.

With reference to FIG. 2, a rectifier circuit 15 can utilize a bridge, diodes or any devices for three phase rectifying signals on power lines 31A-C. Rectifier circuit 15 can include power diodes configured for full wave rectification and can be coupled in a delta source, three wire Y source or a four wire Y source configuration. A ground connection is not required. Alternatively, three separate bridges can be connected line to line.

Clock synchronization circuit 27 provides synchronized switching for stages 26A-C. In one embodiment, circuit 27 provides a three phase clock signal (one synchronization clock signal on each of lines 55A-C at 150 KHz (e.g., 120 degrees out of phase from each other). The synchronization clock signals, one for each of stages 26A-C, advantageously achieve three phase interleaving for system 10.

EMI filter circuit 17 can be coupled between lines 31 A-C and circuit 15. Preferably, an LC low-pass filter network is utilized to maintain high power factor in circuit 15. Common mode filters, MOVs, transorbs, and ferrite beads can also be utilized in circuit 17. Circuit 17 also can be a multi-stage differential filter using a dampening network and low capacitance to maintain higher power factor.

Figure 3:
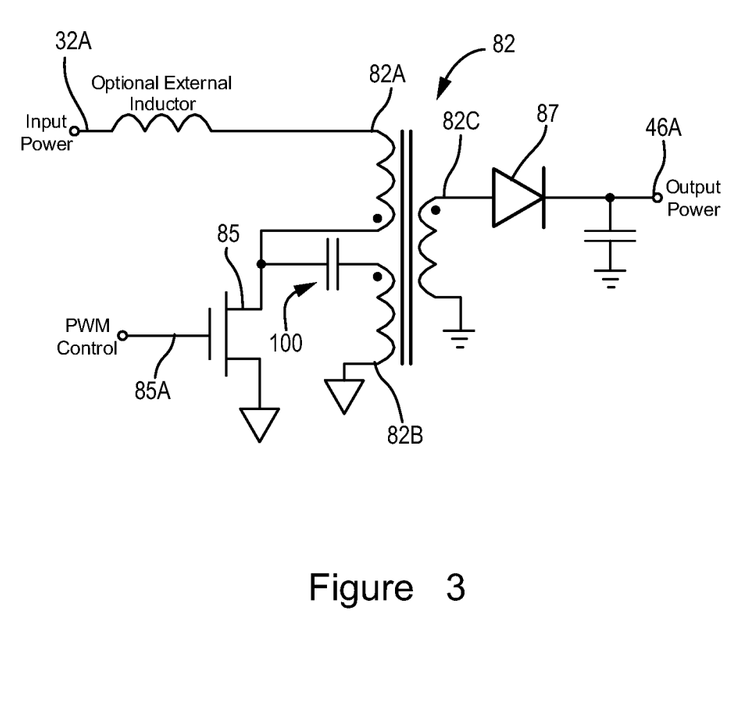
FIG. 3 is an electrical schematic diagram of a power stage for the system illustrated in FIG. 1 in accordance with another exemplary embodiment.

With reference to FIG. 3, power stage circuit 21A of power stage 26A includes a coupled inductor 82. In a preferred embodiment, the portion of circuit 21A shown in FIG. 3 is a phase A power stage within circuit 21A. Inductor 82 can be a coupled inductor including a primary winding 82A, a primary winding 82B, and one secondary winding 82C. Windings 82A-C preferably have a ratio of in accordance with the desired input and output values for stage 21A.

Preferably, inductor 82 is a low loss high frequency coupled inductor. A litz wire is utilized for reduced skin effect. Windings are interleaved/parallel for low leakage inductance. Any turns ratio can be utilized depending on the desired input and output voltages. In one embodiment, a pot core for low leakage and good shielding can be utilized. In one embodiment, inductor 82 includes windings 82A and B with 22 turns each, and secondary winding 82 with 6 turns.

Advantageously, a single power field effect transistor (FET) 85 is utilized to drive inductor 82. FET 85 preferably operates at 150 KHz for a of 300 KHz for interleaved stage 26A. A drive circuit can use a MOSFET driver integrated circuit to drive FET 85 at a gate 85A. Rectifier 87 rectifies the voltage at output 46A. A coupling capacitor 100 can be coupled to between transistor 85 and a node between windings 82A and 82B. Capacitor 100 is preferably at least one COG ceramic capacitor for high temperature (125 degree C.) or at least one polypropylene film capacitor for lower temperatures (105 degree C.). A total of 0.088 micro Farad (uF) can be used for a 1 kilowatt design. Preferably, capacitor 100 has a low dissipation factor for good reliability.

Phase B power stage for stage circuit 26A is substantially similar to the embodiment of stage 21A shown in FIG. 3 and is not shown for brevity. Stage circuits 26B and C are also not shown for the sake of brevity as they operate substantially similarly to stage 26A. Exemplary components are shown in FIG. 3.

Figure 4:
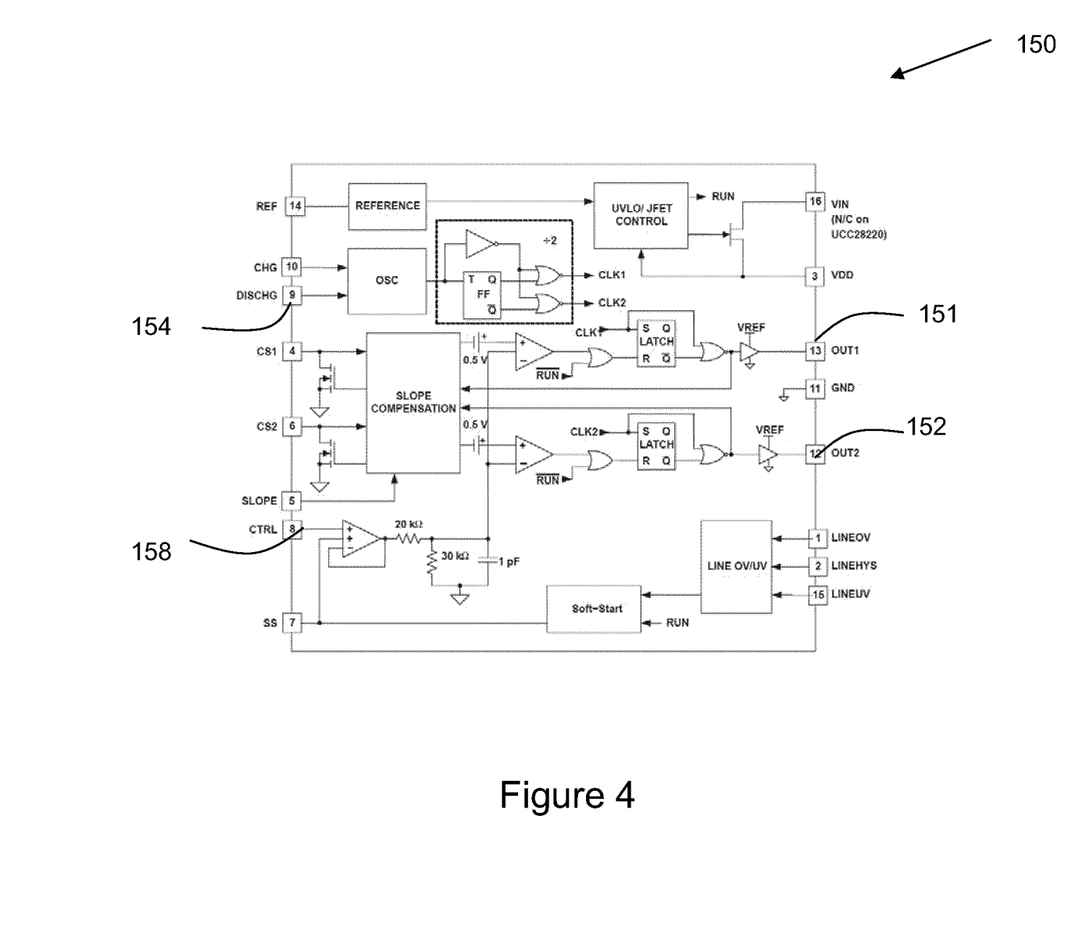
FIG. 4 is a block diagram of a pulse width modulating circuit for the system illustrated in FIG. 1 in accordance with still yet another exemplary embodiment.

With reference to FIG. 4, an interleaved control circuit 150 is preferably part of the control circuit that drives circuit 89 at its gate 85A. Interleaved control circuit 150 can be a BiCMOS interleaved PWM controller (e.g., a UCC 28220 device exemplarily shown in FIG. 4) which ensures current sharing. Output pin 151 can be coupled to the control circuit that drives gate 85A if stage circuit 21A, and output pin 152 can be coupled to a similar pin in another stage in circuit 21A. Interleaved control circuit 150 can be operated according a number of algorithms for setting pulse widths and other switching criteria to achieve the proper power conversion.

The pulse width is set according to load demands. Circuit 150 includes a discharge pin 154 coupled to line 55A of synchronization circuit 77 for receiving the synchronization clock signal. A circuit similar to circuit 150 is also coupled in a similar manner to lines 55B and C for circuits 19B and C, respectively. The voltage error signal from circuit 48 is provided to a pin 158 of circuit to adjust the pulse width at outputs 151 and 152 so that system 10 provides the appropriate signal at output 20. Phase B and C error signals from circuit 68 are provided to a similar pin in circuits 19B and C, respectively, to appropriately share current among stages 26A-C. Pulse widths can vary from any range depending upon design criteria and load conditions. In one embodiment, pulse widths vary form 0 to 75% or 0 to 50%. Circuit 150 can be connected to other components in accordance with design criteria and system parameters and data sheets associated with circuit 150.

Figure 5:
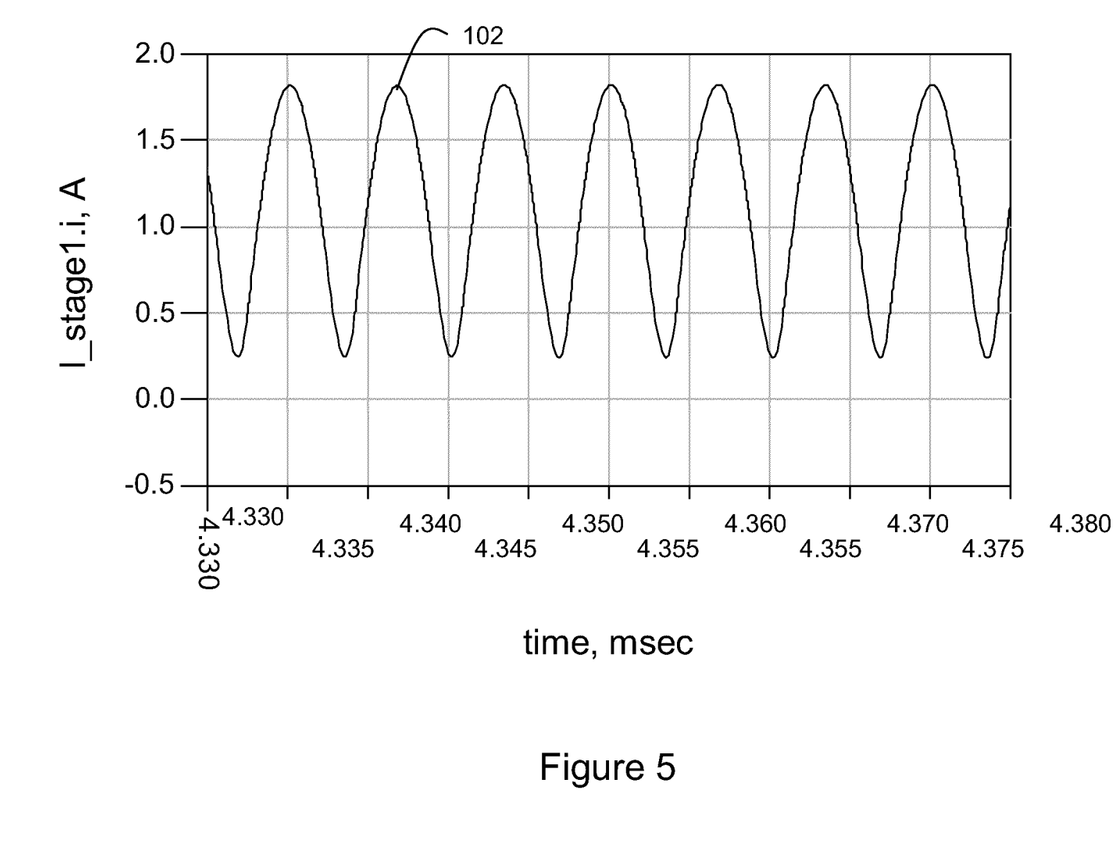
FIG. 5 is a waveform diagram showing input current ripple for a single stage.

With reference to FIG. 5, a simulated waveform 102 is shown on an X axis representing time in microseconds and a Y axis representing current in amperes. Waveform 102 represents input current ripple for a single stage such as stage 26A and shows an 1.8 amp amplitude peak.

Figure 6:
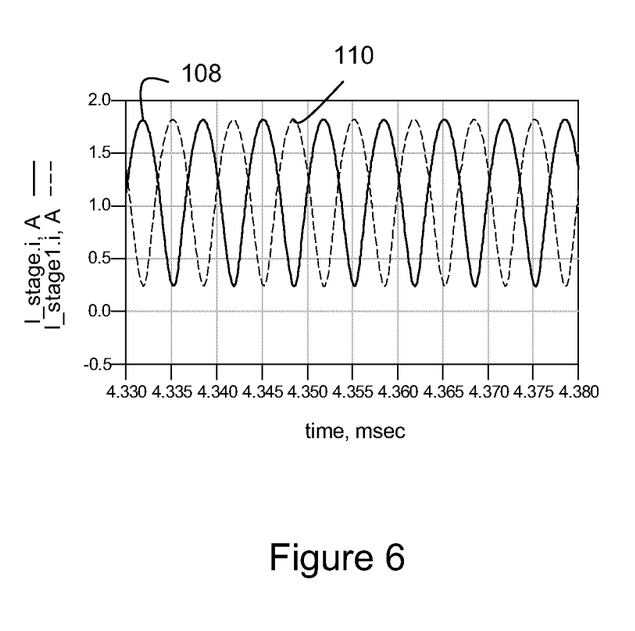
FIG. 6 is a waveform diagram showing input current of two interleaved stages per phase for the system illustrated in FIG. 1 in accordance with yet another exemplary embodiment.

With reference to FIG. 6, interleaving two stages creates current cancellation through summation of the two waveforms 108 and 110. Simulated waveforms 108 and 110 are shown on an X axis representing time in microseconds and a Y axis representing current in amperes. Waveforms 108 and 110 are shown for an exemplary 1 kilowatt/3 phase system. Ripple current is preferably at twice the switching frequency. In an exemplary embodiment, twice the switching frequency is 300 kHz.

Figure 7:
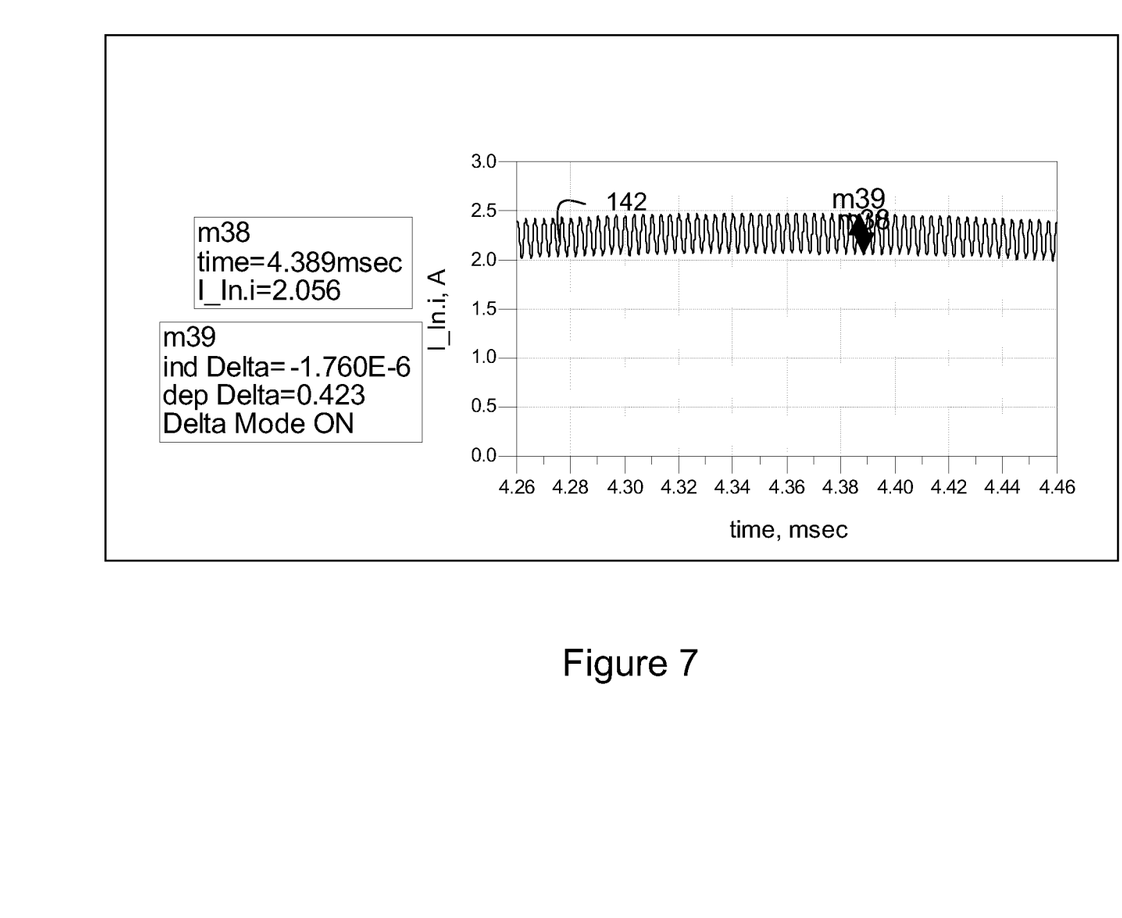
FIG. 7 is a waveform diagram showing ripple current cancellation resulting from the interleaving of two stages per phase to reduce input ripple in accordance with still another exemplary embodiment.

With reference to FIG. 7, waveform 142 represents the current at 32A with ripple cancellation from two interleaved power stages. An X-axis represents time and a Y-axis represents current in amperes at input current 32A. Combined waveforms 108 and 110 reduce ripple current at line 32A to 210 milliamp amplitude peak.

Figure 8:
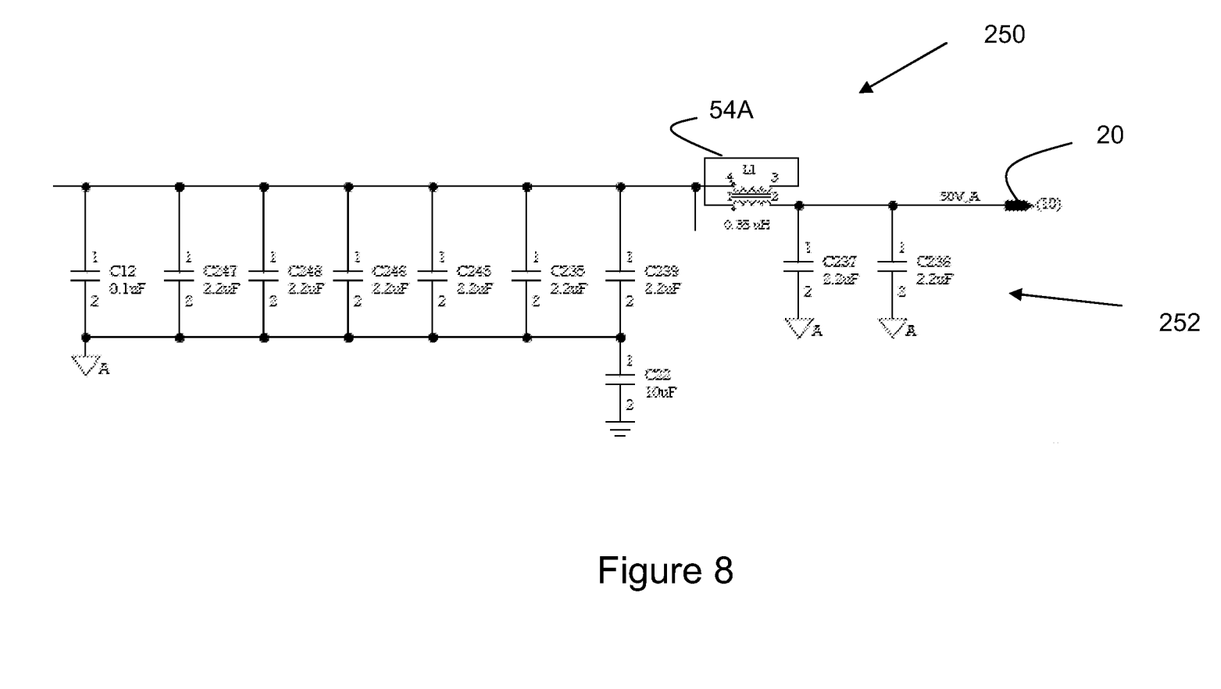
FIG. 8 is an electric schematic diagram of a filter for a power stage of the system illustrated in FIG. 1 in accordance with another exemplary embodiment.

With reference to FIG. 8, output filtering can be performed by filter circuit 250. Preferably, circuit 250 utilizes ceramic capacitors 252 and a high frequency inductor 54A. High frequency inductor 54A can be a power bead inductor. Exemplary components are shown in FIG. 8 with exemplary values for each component.

Figure 9:
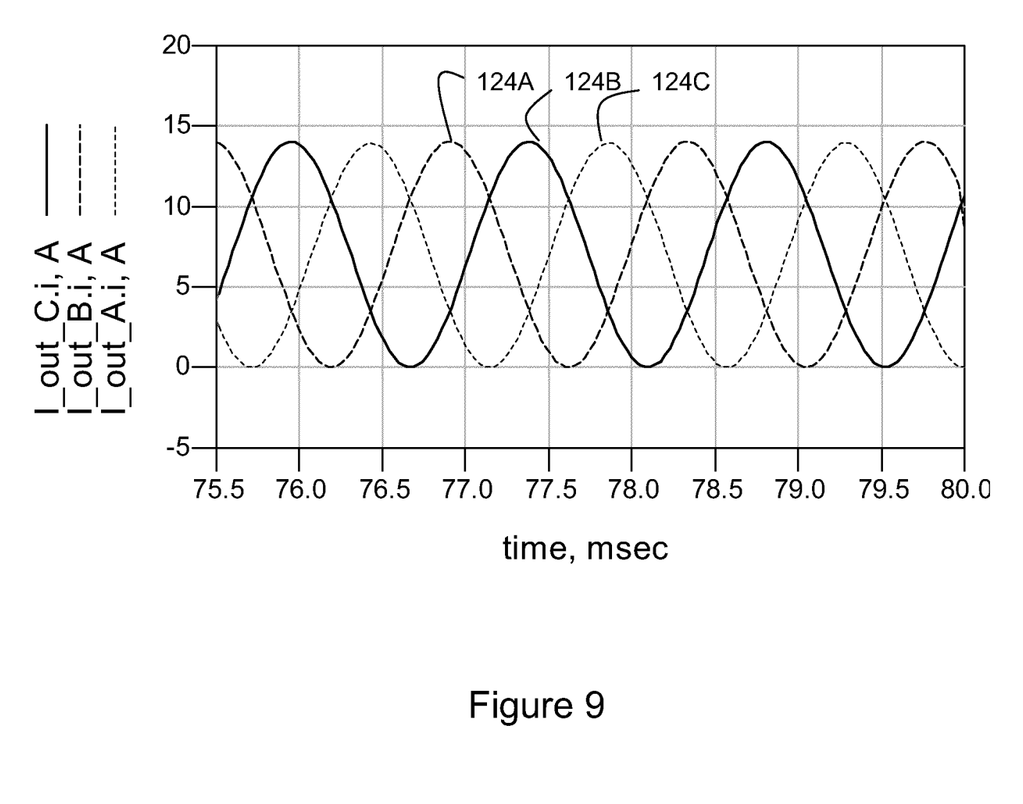
FIG. 9 is a waveform drawing showing current sharing for the system illustrated in FIG. 1 before a voltage imbalance in accordance with another exemplary embodiment.

With reference to FIG. 9, output current per phase (high frequency not included) is shown before a voltage imbalance by simulated waveforms 124A-C. An X-axis represents time and a Y-axis represents currents in amperes at outputs of stages 26A-C.

Figure 10:
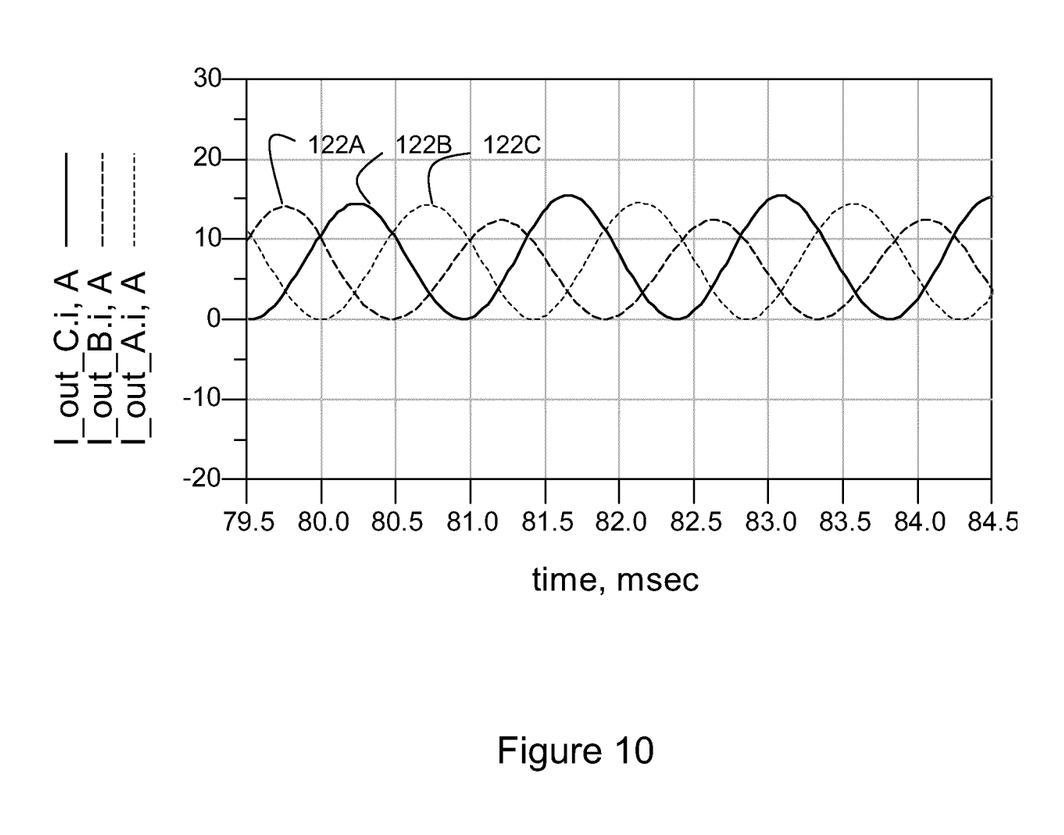
FIG. 10 is a waveform drawing showing output current per phase during a voltage imbalance, taking place at 80 ms, for the system illustrated in FIG. 1 in accordance with yet another an exemplary embodiment.
Figure 11:
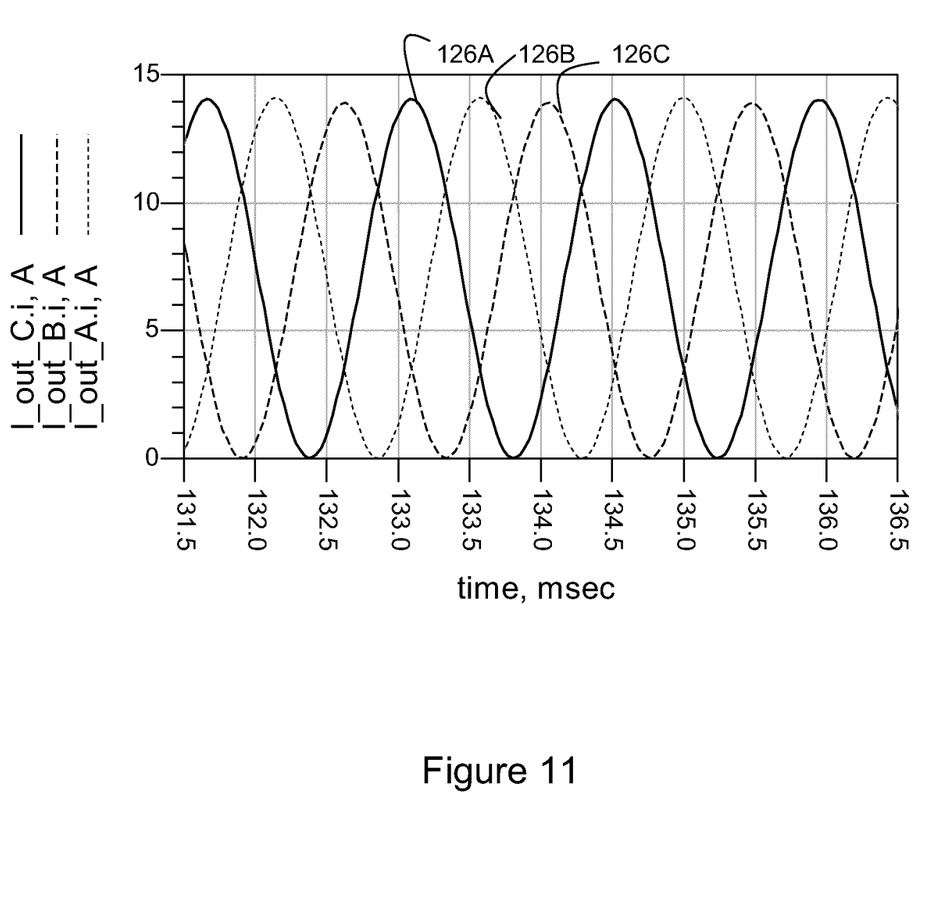
FIG. 11 is a waveform drawing showing uniform output current after a sufficient amount of time for current share circuitry to correct for a voltage imbalance for the system illustrated in FIG. 1 in accordance with still a further exemplary embodiment.

With reference to FIG. 10, output current per phase (high frequency not included) is shown during a voltage imbalance by simulated waveforms 122A-C. It can be seen there is an imbalance in the output current before the low pass filter and integrator has been able to respond to create a new error signal. An X-axis represents time and a Y-axis represents currents in amperes at outputs of stages 26A-C With reference to FIG. 11, output current per phase (high frequency not included) is shown after a voltage imbalance by simulated waveforms 126A-C. After adequate time for the low pass filter and integrator to respond, all the output current amplitudes are equal resulting in constant power for each converter. An X-axis represents time and a Y-axis represents currents in amperes at outputs of stages 26A-C.

Figure 12:
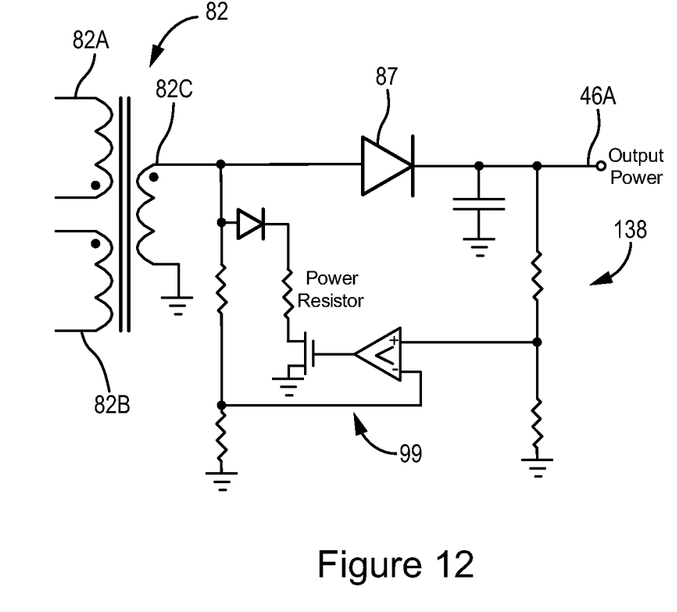
FIG. 12 is an electric schematic diagram of an active damper for a power stage of the system illustrated in FIG. 1 in accordance with another exemplary embodiment.

With reference to FIG. 12, an active damper circuit 138 can be used with system 10. An active damper circuit can be much more efficient than a resistive and capacitive damper technique since the switch connecting the power resistor has a selective on period and can be switched on at the very start of when the discontinuous mode is entered. Time selective damping minimizes power dissipation in the resistive element. Circuit 138 includes circuitry 99 for removing parasitic energy stored in the SEPIC coupled inductor as the converter enters discontinuous conduction mode. This parasitic energy is variable due to a low frequency resonance during discontinuous mode and must be damped to maintain a high power factor. Circuit 138 can be provided for each of stage circuits 21A-C.

Advantageously, system 10 error amplifier can utilize a crossover frequency of 400 Hz which is much higher than a conventional single phase power factor correction circuit. When accurate power sharing occurs, output ripple current is reduced significantly (almost no ripple current). If crossover frequencies are made too high, accurate power sharing is more difficult and input current distortion may occur.

While the detailed drawings, specific examples and particular formulation given describe preferred and exemplary embodiments, they serve the purpose of illustration only. The invention disclosed is not limited to the specific forms shown. For example, the drawings include particular circuit component values and the specification mentions specific component type and values which are provided for the sake of illustration and are not provided in a limiting fashion. Further, although particular stages are described, power stages could be replaced with other types of power stages without departing from the scope of your invention. The systems and methods depicted and described are not limited to the precise details and conditions disclosed. Furthermore, other substitutions, modifications, changes and omissions may be made in the design, operation conditions and arrangement of the exemplary embodiment without departing from the scope of the invention as expressed in the appended claims.

What is claimed is:

1. A converter, comprising:
   at least three power stages including a power factor control circuit; and
   an active shared control circuit receiving at least three sense signals, each of the sense signals being associated with a parameter of a respective one of the power stages, wherein the active shared control circuit provides at least three controls signals, each of the control signals being associated with a respective power factor control circuit of the power stages, whereby the active share control circuit balances the current supplied by the power stages via the control signals, and wherein the active shared control circuit comprises at least two differential amplifiers coupled to receive the sense signals, the sense signals being current sense signals and one of the sense signals is provided as a reference to an input on each of the differential amplifiers.

2. The converter of claim 1 wherein the converter is a three phase alternating current input converter and power sharing between the power stages yield low ripple current at multiples of line frequency, thereby reducing a need for large output capacitors.

3. The converter of claim 2 wherein an inductor in each of the power stages operates in a discontinuous mode where most of the energy is removed from the inductor during each switching cycle or wherein the inductor operates in a continuous conduction mode.

4. The converter of claim 1 wherein each power stage includes a transformer.

5. The converter of claim 1 wherein each power stage has at least one of a boost topology, a single ended primary inductance converter topology, a flyback topology, a buck topology or any transformer isolated versions of the listed topologies.

6. The converter of claim 1 wherein two of the sense signals are provided independently to a respective differential amplifier of the differential amplifiers through a respective low pass filter to attenuate harmonics of line frequency.

7. The converter of claim 1 wherein the power factor control circuit is a pulse width modulated control circuit with a fixed duty cycle with respect to line frequency.

8. The converter of claim 1 further comprising slave integrators for modifying a master error signal for controlling respective error signals to local pulse width modulation circuits to yield a desired current sharing characteristic, wherein the sense signals are provided to slave integrators through respective low pass filters.

9. The converter of claim 1 further comprising:
slave integrators for modifying a master error signal for controlling respective error signals to local pulse width modulation circuits to yield a desired current sharing characteristic.

10. The converter of claim 1 wherein the active shared control circuit includes integrators, the integrators shifting a master error amplifier voltage for a first of the power stages to produce an error amplifier voltage and wherein a bandwidth of the integrators is limited to avoid feedback loop interaction and oscillatory behavior.

11. A three phase power converter, comprising:
a first power stage for receiving first phase rectified power;
a second power stage for receiving second phase rectified power;
a third power stage for receiving third phase rectified power; and
an active control circuit having a first control output coupled to the first power stage, a second control output coupled to the second power stage, and a third control output coupled to the third power stage, the active control circuit having a first input coupled to receive a first sense signal from a first output of the first power stage, a second input coupled to receive a second sense signal from a second output of the second power stage, a third input coupled to receive a third sense signal from a third output of the third power stage, each of the first, second, and third sense signals being associated with a parameter of a respective one of the first, second and third power stages, wherein the active control circuit balances the current supplied by the first, second and third power stages to achieve a high power factor, wherein the active control circuit comprises at least two differential amplifiers coupled to receive the first sense signal, the second sense signal, and the third sense signal, wherein the at least two differential amplifiers provide control signals for controlling the second power stage, and the third power stage, the second power stage and the third power stage operating as slave stages to provide phase-to-phase current sharing.

12. The converter of claim 11, wherein the at least two differential amplifiers have a low integer bandwidth to reduce oscillatory interaction with a voltage error circuit.

13. The converter of claim 12 wherein an amplifier is coupled to receive one of the first, second, and third sense signals and has a higher bandwidth to improve dynamic line and load regulation, wherein the higher bandwidth is permitted due to accurate power sharing between the power stages.

14. The converter of claim 11 wherein the first, second and third active control circuit provides phase to phase power sharing.

15. The converter of claim 11 wherein each of the first, second and third sense signals are provided through a respective low pass filter to substantially attenuate the amplitude of ripple voltage at harmonics of the line frequency.

16. The converter of claim 11 wherein the converter is a high power factor converter providing isolation between a three phase source and a load with an ability to regulate the output voltage.

17. A method of providing a power, the method comprising:
providing a first power signal from a first phase power stage;
providing a second power signal from a second phase power stage;
providing a third power signal from a third phase power stage;
receiving a first sense signal related to the first power signal;
receiving a second sense signal related to the second power signal;
receiving a third sense signal related to the third power signal;
providing a first control signal to the first power phase stage;
providing a second control signal to the second power phase stage;
providing a third control signal to the third power phase stage; and
wherein the first control signal, the second control signal, and the third control signal are provided to balance the first power signal, the second power signal, and the third power signal and provide a high power factor; and
wherein an active shared control circuit provides the first control signal, the second control signal and the third control signal and comprises at least two differential amplifiers coupled to receive the sense signals, the sense signals being current sense signals and one of the sense signals is provided as a reference to an input on each of the differential amplifiers.

18. The method of claim 17, wherein a power sharing characteristic is independent of each stage input voltage.

19. The method of claim 17, wherein the method provides a high power factor.

20. The method of claim 17 further comprises the first, second and third power signals using a secondary winding connected to a time selective enabled resistive damping circuit thereby removing parasitic energy in a discontinuous portion of a switching cycle to improve power factor performance, wherein a topology for each stage is a single ended primary inductance converter topology or a flyback topology.

* * * * *